March 6, 1951　　　V. C. TANKERSLEY　　　2,544,189
CHICKEN BROODER
Filed Aug. 23, 1946　　　3 Sheets-Sheet 1
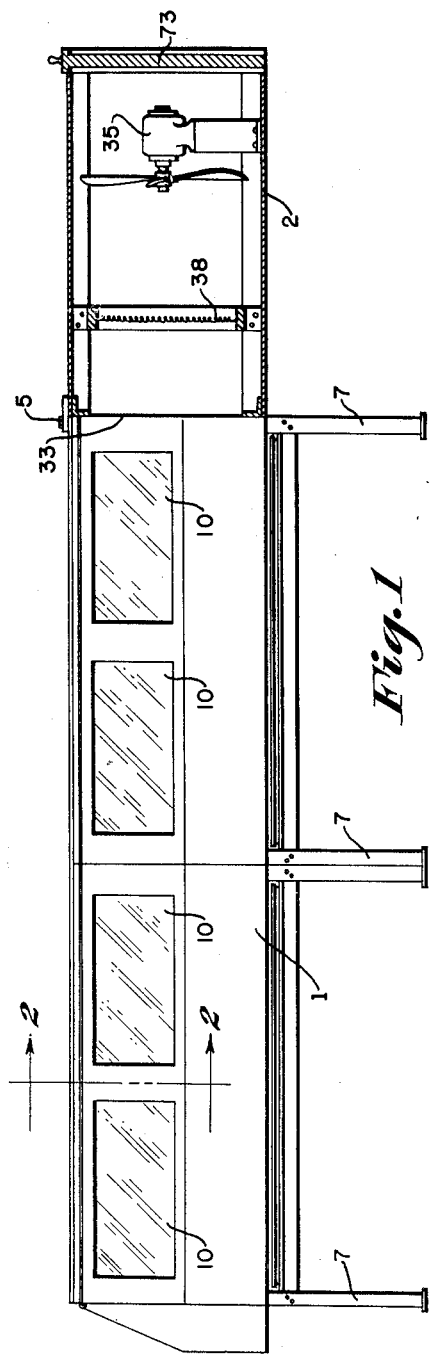
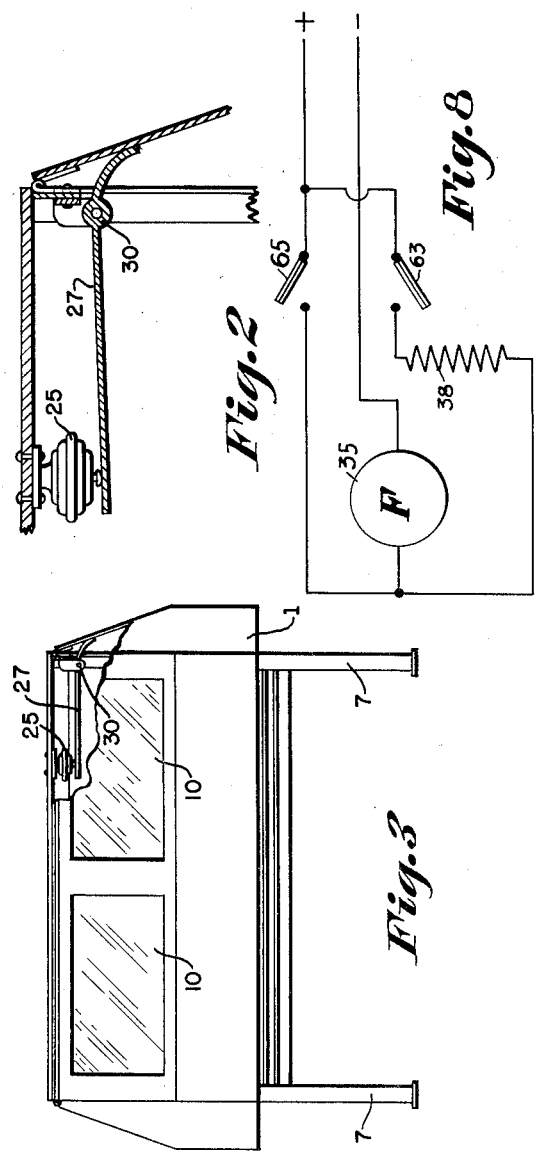
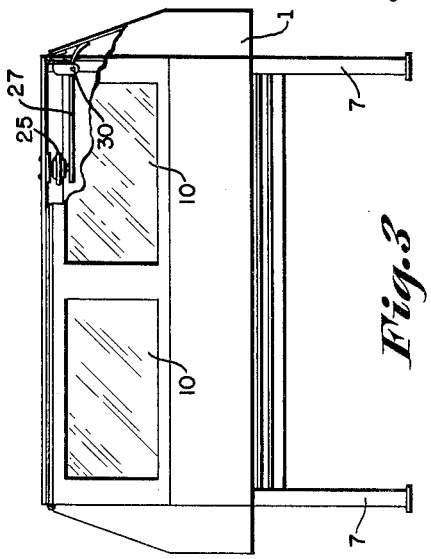
Inventor
Vance C. Tankersley
By Mason, Fenwick & Lawrence
Attorneys March 6, 1951 V. C. TANKERSLEY 2,544,189
CHICKEN BROODER
Filed Aug. 23, 1946 3 Sheets-Sheet 2
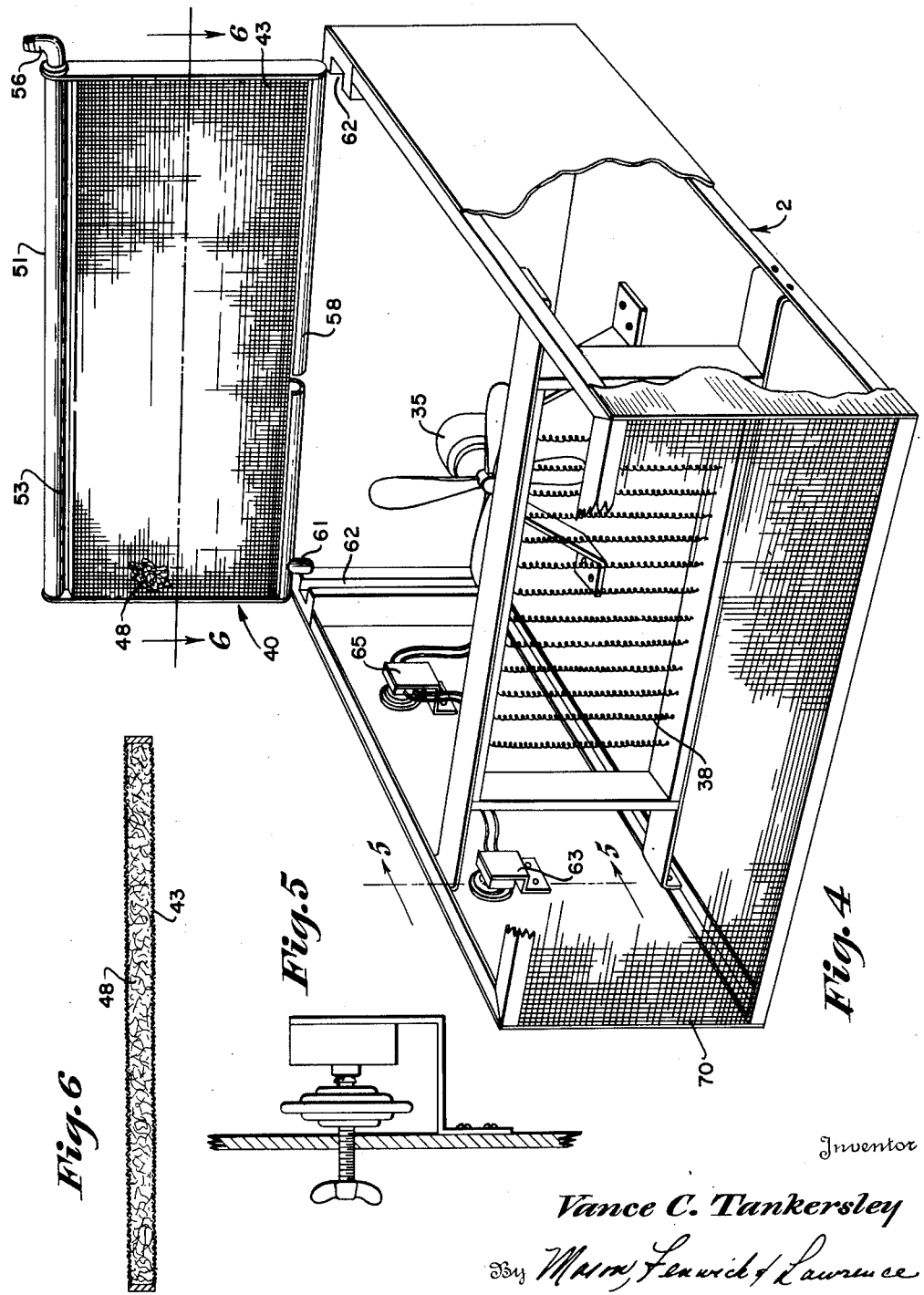
Inventor
Vance C. Tankersley
By Mason, Fenwick & Lawrence
Attorneys March 6, 1951 V. C. TANKERSLEY 2,544,189
CHICKEN BROODER
Filed Aug. 23, 1946 3 Sheets-Sheet 3

Inventor
Vance C. Tankersley
By Marn, Fenwick & Lawrence
Attorneys

Patented Mar. 6, 1951

2,544,189

UNITED STATES PATENT OFFICE 2,544,189

CHICKEN BROODER

Vance C. Tankersley, Miles, Tex.

Application August 23, 1946, Serial No. 692,558

2 Claims. (Cl. 219—39)

This invention relates to chicken brooders and more particularly to brooders having means for heating and cooling the enclosures in which the chickens are held captive.

My invention has for one of its objects the provision of a brooder having means for maintaining suitable temperatures by automatic devices. Another object of my invention is to provide a simple means for humidifying the air passed through a brooder. A further object of my invention is to devise a structure in which air heating, cooling, conditioning and impelling means are housed in a single unit which may be readily attached or detached from an enclosure in which chicks, chickens or other small livestock are housed. A still further object of my invention is to provide my device with windows which are automatically raised or lowered depending on climatic conditions. An even further object of my invention is to provide a device in which air at proper temperature and humidity is slowly and evenly circulated so that temperature conditions within the chick enclosure will be uniform throughout to the end that no particular spot therein will be favored and cause crowding or grouping of the chicks away from feed and water boxes provided therein.

My invention will now be described in detail in conjunction with the accompanying drawings in which:

Figure 1 is an elevation lengthwise of my complete device shown fragmentarily to reveal certain details;

Figure 2 is a section through 2—2 of Figure 1 to an enlarged scale;

Figure 3 is an elevation of one end of my device;

Figure 4 is a perspective of a portion of my device showing certain air-conditioning elements;

Figure 5 is a section through 5—5 of Fig. 4;

Figure 6 is a section through 6—6 of Fig. 4;

Figure 8 is a diagrammatic showing of a wiring hookup in accordance with the present invention.

Figure 7:
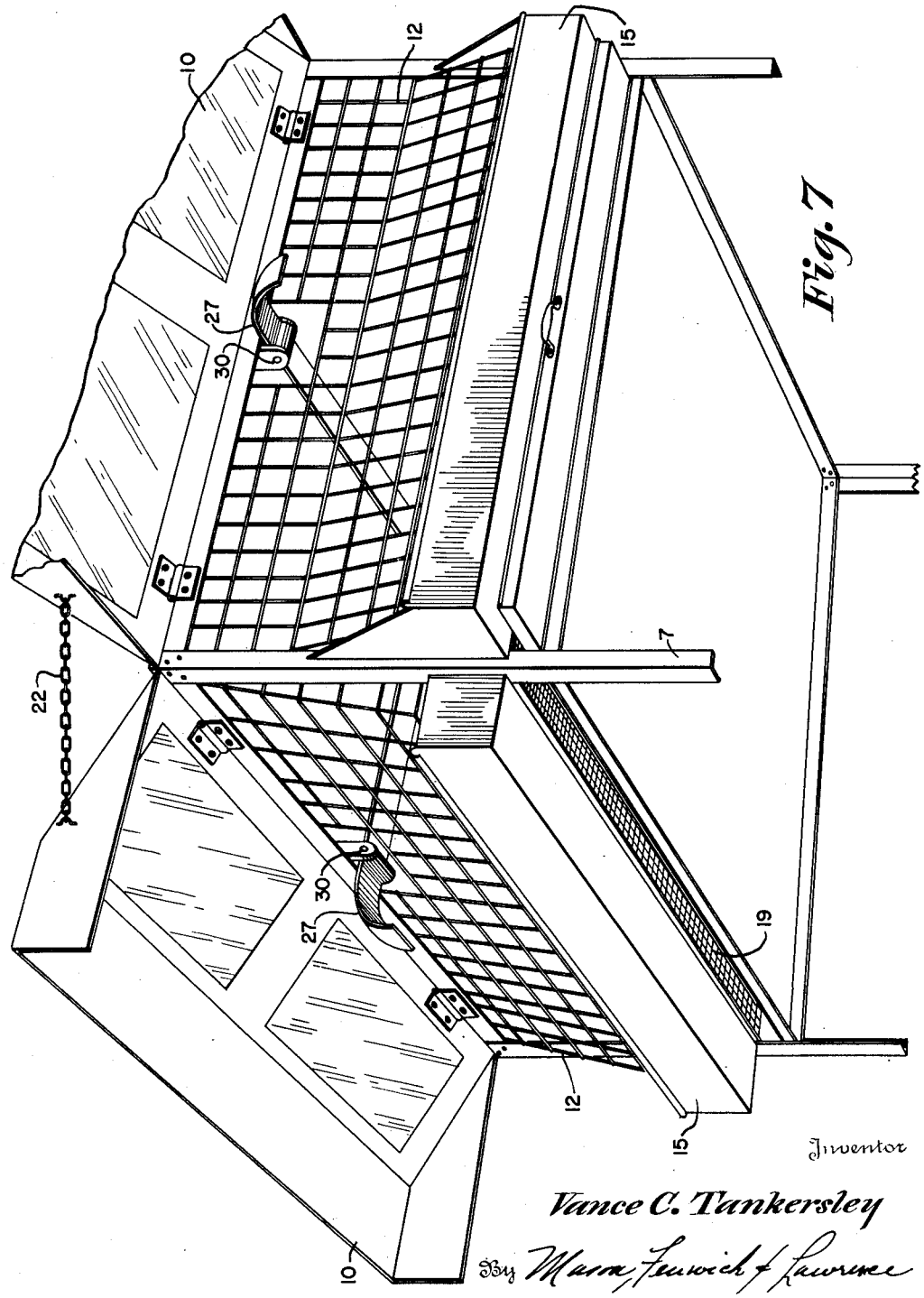
Figure 7 is a perspective view of the chick inclosure showing details of the windows and feed boxes, and mechanism for operating the windows.

With reference to the figures of the drawings, my device comprises an inclosure 1 adapted for housing chicks and a housing 2 adapted to hold certain air-conditioning elements and adapted to be bolted at 5 or otherwise removably attached to the housing 1. Housing 1 may be supported on legs 7 as shown in Fig. 1, or may be constructed without legs so as to be used in a battery type brooder. Windows 10 are provided pivotally related at their top edges (Fig. 7) to enclosure 1. The open faces of enclosure 1 may thus be closed by the windows under certain conditions as hereinafter described. Wire mesh or screening 12 is utilized to prevent escape of chicks from the enclosure, and boxes 15 for holding food or water are disposed outside screening 12 in a conventional manner. Also provided is a removable bottom 19 of open mesh, as shown in Fig. 7, to permit droppings to pass therethrough, the construction thereof being generally conventional. Windows 10 may be manually operated and latched by any suitable means such as the chain and hook arrangement 22 or they may be automatically operated by individual thermostatic bellows 25, as best shown in Fig. 2, which bellows actuate levers 27 pivoted at 30 and extending through screening 12 to engage respective windows. The construction is such that in warm weather bellows 25 will expand sufficiently to open windows 10 an appreciable extent, whereas in cold weather contraction of bellows 25 will permit closure by action of gravity of the several windows.

Enclosure 1 is provided with an open face which will be understood to be in the plane of the channel member 33 (Fig. 1) and housing 2 (Fig. 4) is secured contiguous to such open space for a purpose now to be described.

Supported within housing 2 is an electric fan 35 and forwardly of fan 35 is a resistance wire grid comprising a thermal element 38 which may be energized by electricity to generate heat. Rearwardly of the fan is a humidifying unit 40 comprised of a substantially flat container formed of wire mesh 43. Within such container is a loose packing of excelsior or other water absorbent material 48. Adjacent the top of container 40 is a pipe 51 having perforations 53 at its lower surface and a fitting 56 at one end adapted to be connected to a source of water. The bottom of container 40 is formed with a drip gutter 58 adapted to catch excess water not evaporated from the excelsior due to the suction of air therethrough caused by fan 35. A drip pipe 61 permits emptying gutter 58. Container 40 is in this instance adapted to be slidably attached to housing 2 in grooves 62, as will be clearly understood from Fig. 4.

Thermostatically operated switches 63 and 65 are provided secured to wall of housing 2. These are bellows-operated switches of conventional structure and preferably of an adjustable type. By suitably wiring the switch 63 to heater element 38 and fan 35, it is possible to provide a condition wherein should the ambient temperature fall below a predetermined value, the switch will close a circuit energizing both fan 35 and heater 38. On the other hand, at another predetermined ambient temperature, the switch 65 will energize only the fan 35. Accordingly, it will be appreciated that under certain conditions fan 35 will be energized to draw air through the humidifying element 40, assuming such element to be lowered into position directly back of the fan. Cooling air will thus be impelled through wire mesh 70 disposed across the open end of housing 2, such cooling air passing into the enclosure 1 increasing the comfort and well being of the chicks therein. There are times when the warming of the air within enclosure 1 is more important than obtaining fresh air from outside. In this event the humidifying element 40 is withdrawn from the grooves 62 and a solid panel 73 substituted. Under these circumstances the air within the enclosure and conditioning unit may be warmed and recirculated.

Under conditions where the ambient temperature drops below a value as predetermined inherently or by adjustment of the other switch, both the thermal element 38 and the fan 35 will be energized, whereupon warmed air properly humidified by element 40 will be circulated through enclosure 1.

I have found by running fan 35 slowly so as to ensure a very gentle circulation of air through enclosure 1, that certain undesirable conditions heretofore occurring in such enclosures are eliminated. For instance, in conventional structures employing heater elements the chicks tend to group or crowd around the heater element and will not venture to the outwardly disposed feed and water boxes. Accordingly, starvation and cannibalism frequently occur. Such chicks which venture to leave the warmth of the heater element to seek food at a distance therefrom are chilled and frequently succumb to pneumonia. It will therefore be appreciated that my construction, by providing a gentle flow of air within a suitable predetermined temperature range and properly humidified, effects a uniformly healthy atmosphere within the chick enclosure and avoids the drawbacks found in prior constructions which result in high chick mortality.

I believe that my invention is capable of considerable variation without departing from the spirit thereof and accordingly do not consider myself bound by the specific disclosure hereinabove described except as set forth in the appended claims.

Having thus described my invention, what I claim is:

1. In a brooder, an enclosure for the chicks, an electric fan arranged to circulate air through the enclosure, an electrical heating element positioned in the path of said air, a thermostatically controlled electrical switch within the enclosure, said switch electrically connected to the circuit operative of the fan only and arranged to close said circuit to the fan at a predetermined temperature, and a second thermostatically controlled electric switch within the enclosure connected with the circuit controlling both the fan and heater element and arranged to close both of said circuits at a predetermined temperature.

2. In a brooder, an enclosure for chicks, an electric fan arranged to circulate air through the enclosure, an electrical heating element positioned in the path of said air, a thermostatically controlled electrical switch, said switch electrically connected to a circuit operative of the fan only and adjusted to close said circuit during a relatively high range of temperatures as at noontime, and a second thermostatically controlled switch connected to a circuit controlling both the fan and heater element and adjusted to close said circuits during a relatively low range of temperatures as at night and the early morning hours, both of said thermostatic switches exposed and responsive to the air in the chick enclosure which is to be controlled.

VANCE C. TANKERSLEY.

REFERENCES CITED

The following references are of record in the file of this patent:

UNITED STATES PATENTS

| Number | Name | Date |
| --- | --- | --- |
| 1,597,107 | Petersen | Aug. 24, 1926 |
| 1,693,049 | Pierce | Nov. 27, 1928 |
| 1,746,505 | Van | Feb. 11, 1930 |
| 1,953,794 | Zummach | Apr. 3, 1934 |
| 1,991,280 | Hynes | Feb. 12, 1935 |
| 2,012,088 | Rau | Aug. 20, 1935 |
| 2,123,672 | Du Bois | July 12, 1938 |
| 2,175,758 | Neubert | Oct. 10, 1939 |
| 2,192,276 | Schaefer | Mar. 5, 1940 |
| 2,305,551 | Novak | Dec. 15, 1942 |